United States Patent [19]

Montagnino

[11] 4,022,532
[45] May 10, 1977

[54] SAMPLE POINT INTERFEROMETRIC SYSTEM FOR OPTICAL FIGURE MONITORING

[75] Inventor: Lucian Montagnino, Brookfield Center, Conn.

[73] Assignee: The Perkin-Elmer Corporation, Norwalk, Conn.

[22] Filed: Aug. 13, 1975

[21] Appl. No.: 604,471

[52] U.S. Cl. .............................................. 356/109
[51] Int. Cl.² ........................................ G01B 9/02
[58] Field of Search ...................... 356/109, 106 R

[56] References Cited
UNITED STATES PATENTS 3,767,307  10/1973  Bowker ............................ 356/109

*Primary Examiner*—Edward S. Bauer
*Assistant Examiner*—Conrad Clark
*Attorney, Agent, or Firm*—S. A. Giarratana; F. L. Masselle

[57] ABSTRACT

A system for monitoring the optical figure of a surface utilizes an interferometer and a source of light to provide a measuring beam and a reference beam. Reflective spots are mounted respectively at a number of sample points on the surface and the measuring beam of light is focussed by optical means to provide an image field that includes the reflective spots which are oriented to reflect light from the measuring beam back to the optical means to form a conjugate image of the field of spots on light intensity detectors. The reference beam, whose path length is modulated, is combined with the light reflected from the spots to the detectors. There are separate detector elements for measuring the intensity of the combination of reference beam light and measuring beam light reflected from at least two different spots at one time. A shift in position of one sample point forward or back in relation to another sample point, which is a reference point, is thus monitored by comparing the phase relationship of the combination of the reference light with reflected light derived simultaneously from at least a pair of the sample points.

5 Claims, 4 Drawing Figures

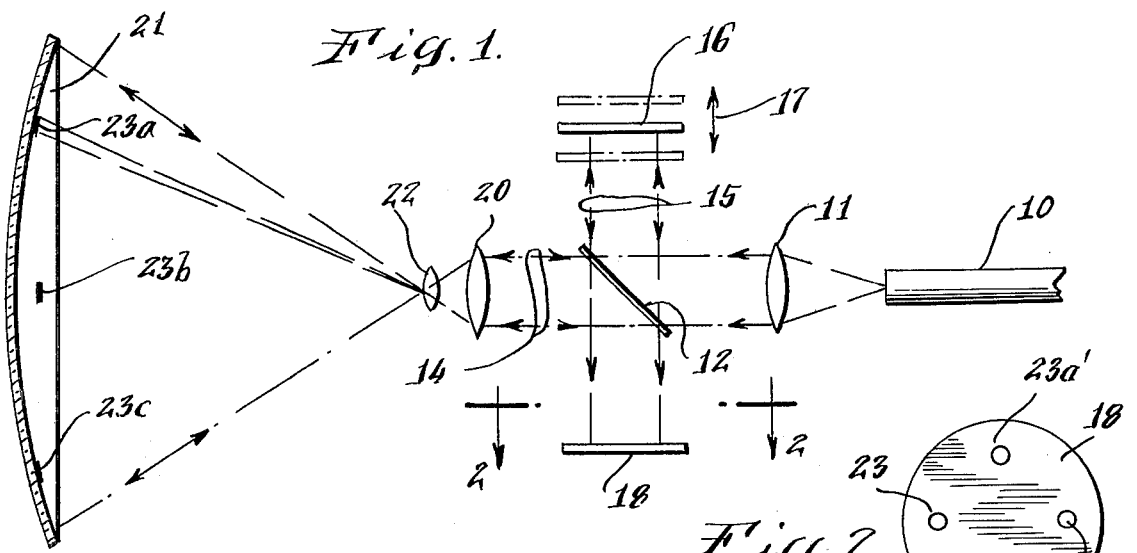
Fig. 1.
Fig. 2.
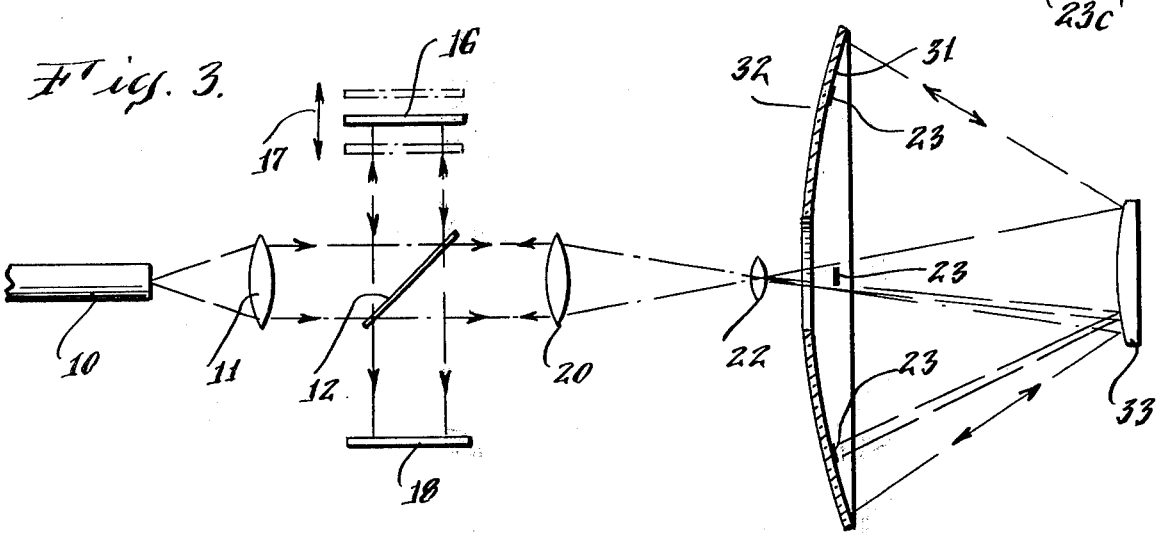
Fig. 3.
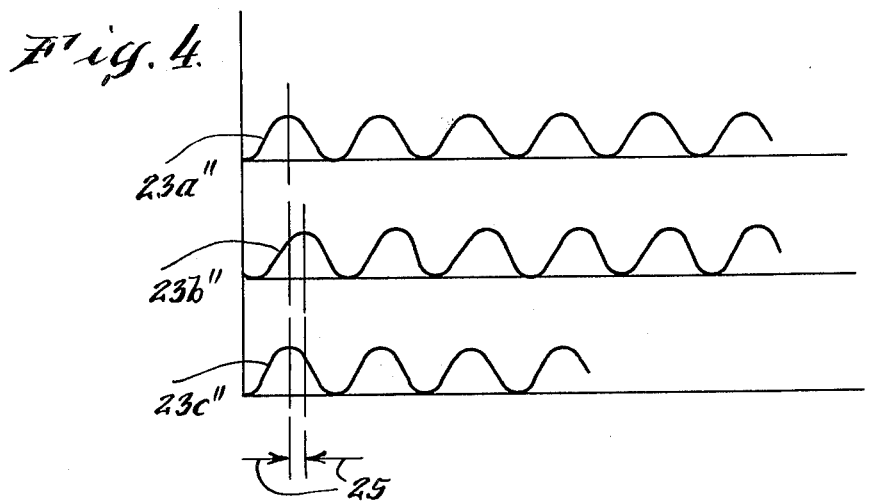
Fig. 4.

SAMPLE POINT INTERFEROMETRIC SYSTEM FOR OPTICAL FIGURE MONITORING

BACKGROUND OF THE INVENTION

The present invention relates to systems for monitoring the configuration of surfaces. In particular it is an interferometric system for sensing the figure, ie. the surface configuration, of optical systems such as the optics of a telescope, for monitoring the surface so as to detect any deviation from the desired configuration caused for example, by warping.

In accordance with known techniques for optical figure sensing collimated light from a laser source is directed to the optical surface from which it is reflected to an interferometer. In the interferometer light reflected from the optical surface is combined with a reference beam of light and the interference pattern thus produced is compared with a reference interference pattern which was generated when the subject optical element had the desired configuration; mismatch of the interference patterns thus indicates distortion of the surface.

Previously known systems for figure sensing optical elements having curved surface areas customarily collect reflected light at a conjugate, e.g., center of curvature, of the optical element, and thus, such systems usually require partial dismantling of the optical system being tested in order to mount the figure sensing apparatus in operative position relative to the optical element being tested.

Principal objects and advantages achieved by the system of the present invention are the provision of an optical figure sensing system that is adapted for sensing the surface configuration at a number of different points thereon so as to reveal the specific area at which distortion occurs as well as the amount of such distortion. Moreover, this system is so constituted that the position at which light is collected for the interferometer portion of the system is not critical; it does not have to be collected at the center of curvature of a curved optical element being tested. Consequently, this system is adapted to be primarily mounted in operative position within an optical system so as to be instantly operable for testing the optics without having to disassemble the optical system. Thus an optical figure sensing system in accordance with this invention has the particular advantage that it may be mounted in an optical system, as an optical system carried in a space vehicle, for monitoring the critical surfaces of the optical system at desired intervals for checking the accuracy of the system; if distortion is detected, information provided by the figure sensing system as to the location and amount of distortion may be applied for correcting the distortion of optical elements which are flexible or semi-flexible by actuating and controlling the operation of rams or other suitable mechanism for moving selected areas of the optical elements as required to restore or achieve the desired configuration.

SUMMARY OF THE INVENTION

The optical figure sensing system of the present invention includes a number of light reflecting spots placed at sample points on the surface to be monitored and an interferometer (which is described herein as an unequal path length interferometer, it being understood that the system could also be constructed to utilize an equal path length interferometer) in combination with a source of light provides a reference beam of collimated light and a measuring beam of collimated light. For the form described herein, using an unequal path length interferometer, the light source is a laser or other source of monochromatic light. The path length of the reference beam is oscillated at a uniform rate and the measuring beam is directed through focussing optics which defines a field including the reflective spots. Light reflected back through the optics from the spots is combined with the reference beam and applied to a detector which suitable consists of a plurality of light intensity detecting elements. The detector is positioned in relation to the focussing optics so that a conjugate image of the field of reflective spots is formed at the operative surface of the detector. The separate elements of the detector are positioned to detect light reflected back from the respective spots, combined with the reference beam light, and the configuration of the surface is monitored by comparing the phase relationships of the variations in the intensity of light derived from one of the sample points, which is taken as a reference point, and of each of the other sample points. The system is initially set so that the intensity signals from each of the detector elements are in phase with, or in a predetermined phase relation with, the sample point selected as the reference when the configuration is desired. Any change thereafter in the phase relationships indicates distortion, ie. movement forward or back, from predetermined relative positions of the respective sample points. A change in phase also indicates the direction and amount of distortion and this information can be utilized for applying pressure either manually or by an automatic system, at the points indicated to adjust the surface to the desired configuration.

DESCRIPTION OF THE DRAWINGS

An illustrative embodiment of the invention is described in detail below with reference to the accompanying drawings in which:

FIG. 1 is a schematic view, in side elevation, of a figure sensing system of this invention showing it mounted for monitoring the configuration of an optical surface;

FIG. 2 is a view along the line 2—2 of FIG. 1 and showing the detector in top plan;

FIG. 3 is a schematic illustration, in side elevation, of the figure sensing system of FIGS. 1 and 2 set up for monitoring an optical surface in a Cassegranian system; and FIG. 4 is a graphic representation of sine wave phase signals from different detector elements of the detector.

DETAILED DESCRIPTION

Referring to FIG. 1 of the drawings, the figure sensing system of the present invention utilizes an unequal path length interferometer for which measuring and reference light beam is supplied by a laser such as a helium-neon laser. In the embodiment illustrated in FIG. 1 a beam of collimated light from a laser 10 is further collimated by a collimating lens 11 and passes to a beam splitter 12 which is substantially 50-50 transmissive-reflective. The beam splitter 12 splits the collimated beam from laser 10 into a measuring beam 14, which in the embodiment shown is the portion of light transmitted by the beam splitter, and a reference beam 15 which is deflected by the beam splitter 12 to a moveable reflecting surface 16. The reflecting surface 16 is provided by a mirror or other reflective surface of a member which is oscillated and moved back and forth at a uniform rate as indicated by arrow 17 by suitable means known in the art, so that the system produces an AC electrical output signal to facilitate signal processing and interpretation of the signal output, as subsequently described. From the oscillating reflective surface 16 of the reference beam 15 is reflected back to the beam splitter 12 through which a portion of the reference beam light passes through to a photoconductor 18.

The measuring beam 14 proceeds from the beam splitter 12 to a focusing lens 20 which focuses the measuring beam so as to define an image field on the optical surface 21 whose configuration is to be monitored by the system of this invention. A field lens 22 may be provided at the focal point of the focussing lens 20 to enhance the field definition but such a field lens is not critical to the operation of the system and could be omitted.

In accordance with an essential feature of the invention the surface 21 to be tested has mounted thereon a number, at least two, of reflective spots 23 located at selected sample points on the surface for reflecting measuring beam light back through the focussing optics to the beam splitter 12. The reflective spots 23, illustrated by spots 23a, 23b and 23c on surface 21 may be provided by any of a variety of suitable reflecting devices such as mirrors, retroreflectors or point scatterers, the only requisite being that they be positioned and constituted to reflect back to the focal point of the lens 20 an amount of light that is sufficiently greater than the amount of light reflected back to the focal point by the adjacent areas of surface 21, to be detected as coming from one of the spots.

As noted, above, the measuring beam 14 is optically focussed, by lens 20, to define a field area on the surface 21 and the reflective spots 23 are placed at sample points on the surface 21 to be within the field of the measuring beam. The number of reflective spots 23 (ie. sample points) is not critical; there must be at least two, but beyond that the number provided would be determined by the number of points at which distortion, ie. warping, would have to be detected and corrected to restore the optical element to effectiveness within a permissible range of error.

There are no severe constraints on the size of the individual reflective spots 23, or on size of the total reflective surface area provided by the spots 23, in relation to the size of the area of the surface 21 that is within the field of the measuring beam; if the total reflective area of the reflective spots 23 is less than about one percent of the operative area of the surface 21 a system embodying this invention will not interfere with the normal operation of the optical element being tested. In practice, the reflective surface areas of the several spots 23 should be substantially equal, and each spot is preferably not less than a few millimeters in diameter in order to provide sufficient reflected light therefrom to be identified by currently known and available types of photodetectors.

Light reflected back through the focussing lens 20 from the reflective spots 23 impinges on the beam splitter 12 so that a portion of this reflected measuring beam light combines with the portion of reference beam light which passes through the beam splitter from reflecting surface 16. This combined beam impinges on the detector 18, which is positioned in relation to the focussing lens 20 so that a conjugate image of the field of the lens 20 is formed on the surface of the detector 18.

Referring to FIG. 2, the detector 18 is made up of a number of separate photodetector elements 23' each positioned to receive light reflected from the respective spots 23; in the drawing the photodetector elements 23a', 23b', and 23c' are thus positioned to receive light from spots 23a, 23b and 23c.

Oscillation of the path length of the reference beam 15 by the oscillations of the reflecting surface 16 oscillates the intensity of light impinging on each one of the photodetector elements 23' so that their respective output signals correspondingly vary in intensity and can be processed through suitable electronic circuitry well known in the art to generate waveform signals of a suitable form such as sinusoidal as shown in FIG. 4, to facilitate comparing the phase relation of the signals from the respective detector elements. In FIG. 4 the waveforms derived from the detector elements are designated 23a'', 23b'' and 23c''.

For the operation of the system the phase relation of the outputs from the several detectors 23' is noted when the surface 21 to be monitored has the desired configuration. Thereafter any change in the phase relation of the detector signals indicates that one or more of the reflective spots 23a, 23b and 23c and hence its associated sample point on the surface 21, has shifted position forward to back from the desired relative position; the direction of the relative displacement is indicated by the direction of the relative phase change. Increments of phase difference are suitably calibrated in terms of amount of relative displacement of the sample points.

In FIG. 4, assuming the phase signals from the several detectors 23 are in exact correspondence when the surface 21 has the desired configuration, the difference in phase between the signals represented by waves 23a'' and 23b'' from the respective detectors 23a' and 23b' is indicated by the dash lines through the respective wave peaks whose displacement is indicated by the between opposing arrows 25. This phase difference indicates that the area of surface 21 under the reflective spots 23a and 23b has undergone displacement by which the sample point at 23b has been shifted relatively forward (to the right in FIG. 1) relative to the sample point at 23a to 23a has been displaced relatively back from 23b. In practice, one of the sample points, and the signal derived therefrom is selected as a reference relative to which the amount and direction of any relative displacement is measured.

Signals derived from each of the other sample points are then successively and separated compared with the reference for monitoring selective areas of the surface 21 so that the direction and amount of distortion occurring at any portion of the surface 21 is identified with a specificity dependent upon the number and arrangement of reflective spots 23 on the surface 21.

Though the interferometer portion of the system illustrated in FIG. 1 consisting of the beam splitter 12, oscillating reflector 16 an associated light path defining elements, is generally of the Twyman-Green type, the specific type or form of interferometer is not critical. For example, an alternative structure has been proposed based on a spherical wavefront interferometer of the multiple beam type (SWIM). The essence of the invention is rather in the provision of a plurality of reflective spots at a number of different sample points on the surface whose figure is to be monitored and comparing the phases of uniform changes in intensity of the light reflected from the several spots therefrom at a given moment.

The system of this invention may be utilized for monitoring the configuration of any optical or other surface in like manner by placing two or more reflective spots at different locations on the surface or at uniformly fixed distances therefrom.

FIG. 3 illustrates the system of this invention set up for monitoring the configuration of the surface 31 of a Cassegranian optical system consisting of a primary mirror 32 and a secondary mirror 33, by placing reflective spots 23 at selective sample points on the surface. The system illustrated is otherwise the same as described with reference to FIG. 1. In this same arrangement, the optical system consisting of the mirrors 32 and 33 could be monitored as a whole by placing reflective spots on the surface of the secondary mirror 33, or both the surfaces of mirror 32 and mirror 33 could separately and simultaneously be monitored by placing spots 23 on the surfaces of each. In the latter case, the reflective spots on each surface would be positioned so that internal reflections in the system from the respective spots would be offset relative to each other; the detector 18 would be in position for the conjugate image of the primary mirror surface to be at the operative surface of the detector 18 and the detector 18 would be made up of two groups of photodetectors, one group being positioned to detect light derived from the spots 23 on the surface of primary mirror 32, the other group being positioned to detect the reflective light derived from the spots 23 on the surface of the secondary mirror 33.

As mentioned above, the reflective spots 23 may be provided in a sufficient number to provide accurate monitoring of the configuration of a surface without interfering with the optical operation of that surface. In practice, the spots 23 would remain fixed on the surface being monitored and an optical system would only be taken out of operation briefly, if at all, for testing by turning on the laser source 10 long enough to derive meaningful signals from the detector 18. Moreover, since the system utilizes an unequal path length interferometer and since the reflective spots 23 can be fixed in any alignment, the system of this invention can be placed in any convenient position with respect to the surface being monitored. Specifically, there is no constraint, as there is in some prior figure sensing systems, that it be located at the center of curvature of an optical element being monitored. Thus, the figure sensing system of this invention may be built permanently into the structure of an optical system and may be operated as desired for generating test signals to monitor the surface of interest without requiring dislocation or change of adjustment of any elements of optical system in which it is mounted.

What is claimed is:

1. A system for monitoring the figure of a surface by detecting shifts of at least two spaced sample points on said surface from predetermined positions thereof comprising:
    light reflecting elements disposed respectively at said points,
    each of said elements being individually oriented and constituted to reflect light to a preselected focal point disposed in a location independent of the radius of curvature of the surface being monitored,
    each of said elements having a detectably different reflective capacity with respect to the adjacent portion of said surface with respect to said focal point,
    means including interferometer means and detecting means for directing a beam of light at said elements and comparing the intensity of the light reflected from one element with respect to the other elements.

2. A system according to claim 1 wherein said interferometer means is an unequal path length interferometer.

3. A system according to claim 1 wherein said means including interferometer means and detecting means for directing a beam of light at said elements and comparing the intensity of the light reflected from one element with respect to the other elements includes optical means for focusing a collimated beam of light and defining a field including said light reflecting elements, said detecting means and said optical means being positioned for a conjugate image of said field of elements to be formed at the detecting means.

4. A system according to claim 3 wherein said detecting means includes means for separately detecting the intensity of the light reflected from at least two of said elements.

5. A system according to claim 1 wherein said surface is a mirror surface in a Cassegranian optical system.

* * * * *